United States Patent
Yaguchi et al.

(10) Patent No.: US 10,655,515 B2
(45) Date of Patent: May 19, 2020

(54) BLOW-BY GAS RECIRCULATION DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Hiroshi Yaguchi, Susono (JP); Takeshi Fukui, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 199 days.

(21) Appl. No.: 15/738,436

(22) PCT Filed: Jun. 30, 2016

(86) PCT No.: PCT/JP2016/003152
§ 371 (c)(1),
(2) Date: Dec. 20, 2017

(87) PCT Pub. No.: WO2017/010054
PCT Pub. Date: Jan. 19, 2017

(65) Prior Publication Data
US 2018/0187582 A1    Jul. 5, 2018

(30) Foreign Application Priority Data

Jul. 14, 2015 (JP) .................. 2015-140709

(51) Int. Cl.
*F01M 13/02* (2006.01)
*B60T 17/00* (2006.01)
(Continued)

(52) U.S. Cl.
CPC .......... *F01M 13/021* (2013.01); *B60T 13/52* (2013.01); *B60T 17/00* (2013.01); *B60T 17/02* (2013.01);
(Continued)

(58) Field of Classification Search
CPC .... F01M 13/00; F01M 13/021; F01M 13/023; F01M 2013/026; F01M 2013/027;
(Continued)

(56) References Cited

U.S. PATENT DOCUMENTS 8,955,500 B2 *  2/2015  Spix ................. F02M 25/06
                                              123/572
10,352,280 B2 *  7/2019  Yaguchi ........... F02M 35/10222
(Continued)

FOREIGN PATENT DOCUMENTS

| JP | 62-279220 | 12/1987 |
|----|-----------|---------|
| JP | 2006-132360 | 5/2006 |
| JP | 5494206 | 5/2014 |

*Primary Examiner* — Thai Ba Trieu
*Assistant Examiner* — Dapinder Singh
(74) *Attorney, Agent, or Firm* — Finnegan, Henderson, Farabow, Garrett & Dunner, LLC

(57) ABSTRACT

This blow-by gas recirculation device for an internal combustion engine is provided with a vacuum pump which supplies negative pressure to a brake booster and usable for recirculation of blow-by gas to an intake passage. This device includes: a PCV device for recirculating blow-by gas in a crankcase to the intake passage; a ventilation shortage region determination unit which determines whether or not an operational region of the engine is a PCV ventilation flow rate shortage region; and a brake negative pressure determination unit which determines whether or not the negative pressure of the brake booster is secured. The vacuum pump ventilates blow-by gas in the crankcase only when the determination units determines that the operational region is the PCV ventilation flow rate shortage region and that the negative pressure is secured. This reduces a contact risk of blow-by gas with engine oil, and inhibits the degradation of the oil.

6 Claims, 8 Drawing Sheets

(51) Int. Cl.
  *B60T 17/02*        (2006.01)
  *F01M 13/00*        (2006.01)
  *B60T 13/52*        (2006.01)
  *F02B 37/00*        (2006.01)

(52) U.S. Cl.
  CPC .......... *F01M 13/00* (2013.01); *F01M 13/023* (2013.01); *F01M 2013/0094* (2013.01); *F01M 2013/026* (2013.01); *F01M 2013/027* (2013.01); *F02B 37/00* (2013.01); *F02D 2200/0406* (2013.01); *F02D 2200/60* (2013.01); *F02D 2250/08* (2013.01); *F02D 2250/41* (2013.01)

(58) Field of Classification Search
  CPC . F01M 2013/0094; B60T 13/52; B60T 17/00; B60T 17/02; F02B 37/00; F02D 2200/0406; F02D 2200/60; F02D 2250/08; F02D 2250/41
  USPC .................................. 60/605.1; 123/572–574
  See application file for complete search history.

(56) References Cited

U.S. PATENT DOCUMENTS

| | | | |
|---|---|---|---|
| 2013/0146039 A1* | 6/2013 | Pursifull | F01M 1/02 |
| | | | 123/572 |
| 2014/0014080 A1* | 1/2014 | Beshay | F01M 13/022 |
| | | | 123/574 |
| 2014/0246002 A1* | 9/2014 | Spix | F02M 25/06 |
| | | | 123/572 |
| 2016/0369718 A1* | 12/2016 | Pursifull | F01M 13/00 |

\* cited by examiner

BLOW-BY GAS RECIRCULATION DEVICE FOR INTERNAL COMBUSTION ENGINE

TECHNICAL FIELD

The present invention relates to a blow-by gas recirculation device for an internal combustion engine.

BACKGROUND ART

In an internal combustion engine, generally, unburnt gas (referred to as blow-by gas) leaks through a gap between piston and cylinder during a compression stroke. When the blow-by gas (especially, NOx contained in the gas) is brought into contact with engine oil, it promotes degradation caused by oxidation. In view of this, there has been known a blow-by gas recirculation device for recirculating blow-by gas to an intake system of an engine for the purpose of treatment so as to reduce the risk of contact between the blow-by gas and engine oil.

In, for example, a blow-by gas recirculation device disclosed in PTL1, a communication hole is formed to allow a crankcase and a chamber inside of a cylinder head cover to communicate with each other, and then, the blow-by gas staying inside of the crankcase is led into the chamber inside of a cylinder head cover, to be thus recirculated to an intake passage. Additionally, a suction port and a discharge port at a vacuum pump for supplying a negative pressure to a brake booster are opened with respect to the crankcase and the chamber inside of a cylinder head cover via conduits, respectively, and furthermore, a control valve is disposed on the conduit connected to the crankcase in such a manner as to be opened only when a difference in pressure between the crankcase and the chamber inside of a cylinder head cover becomes a predetermined pressure value or higher. In this manner, during the recirculation of the blow-by gas in which the control valve is open, by the vacuum pump, the blow-by gas is sucked from the inside of the crankcase and is fed to the chamber inside of a cylinder head cover.

CITATION LIST

Patent Literature

PTL 1: Japanese Patent Laid-Open No. S62-279220 (1987)

SUMMARY OF INVENTION

Technical Problem

However, in the blow-by gas recirculation device disclosed in PTL1, the suction port and the discharge port at the vacuum pump for supplying a negative pressure to the brake booster are opened to the crankcase and the chamber inside of a cylinder head cover via the conduits, respectively, and furthermore, the control value is disposed on the conduit connected to the crankcase in such a manner as to be opened only when a difference in pressure between the crankcase and the chamber inside of a cylinder head cover becomes a predetermined pressure value or higher. As a consequence, the blow-by gas staying inside of the crankcase cannot be moved without any difference in pressure, and thus, it remains there. Thus, it is impossible to reduce the risk of contact between the blow-by gas and engine oil, thereby failing to sufficiently inhibit the degradation of the oil.

The blow-by gas staying inside of the crankcase is once sucked by the vacuum pump, and then, is fed to the chamber inside of a cylinder head cover. However, a pressure inside of the crankcase becomes negative caused by the suction by the vacuum pump, and therefore, the blow-by gas staying in the chamber inside of a cylinder head cover is returns to the crankcase through the communication hole for allowing the crankcase and the chamber inside of a cylinder head cover to communicate with each other, and circulates. As a consequence, the concentration of the blow-by gas inside of the crankcase cannot become low, thus failing to achieve the sufficient inhibition of oil degradation.

Additionally, in order to suppress the consumption of the negative pressure to be supplied from the vacuum pump to the brake booster for the recirculation of the blow-by gas, the negative pressure is supplied from the vacuum pump to the crankcase only when a difference in pressure between the crankcase and the chamber inside of a cylinder head cover is a predetermined pressure value or higher, as described above. However, the negative pressure inside of the brake booster also vary according to number of depressions of a brake pedal or the like irrespective of the difference in pressure, and therefore, the negative pressure inside of the brake booster may not be sufficiently secured.

The blow-by gas recirculation device disclosed in PTL1 uses a mechanical vacuum pump, which is driven by an internal combustion engine all the time, and therefore, there is a lot of wasteful work and which is a factor that causes poor fuel economy.

The present invention has been accomplished in view of the above-described circumstances experienced by the prior art. A principal object of the present invention is to provide a blow-by gas recirculation device for an internal combustion engine utilizing a vacuum pump, the blow-by gas recirculation device for an internal combustion engine being capable of reducing the risk of contact between blow-by gas and engine oil so as to inhibit the degradation of the oil.

Moreover, another object of the present invention is to provide a blow-by gas recirculation device for an internal combustion engine which sufficiently securing a negative pressure inside of a brake booster all the time and has less wasteful work.

Solution to Problem

According to one aspect of the present invention, there is provided a blow-by gas recirculation device for an internal combustion engine including a vacuum pump that serves as a negative pressure source for a brake booster and is usable also for recirculation of blow-by gas to an intake passage. Furthermore, the blow-by gas recirculation device includes:

a PCV device configured to recirculate blow-by gas staying inside of a crankcase to the intake passage;

a ventilation shortage region determination unit configured to determine whether or not an operational region of the engine is an operational region in which the ventilation flow rate of the blow-by gas staying inside of the crankcase by the PCV device is short; and a brake negative pressure determination unit configured to determine whether or not the brake negative pressure of the brake booster is secured. Here, the vacuum pump ventilates the blow-by gas staying inside of the crankcase only when the ventilation shortage region determination unit determines that the operational region of the engine is the operational region in which the ventilation flow rate of the blow-by gas staying inside of the crankcase by the PCV device is short, and furthermore, the brake negative pressure determination unit determines that the brake negative pressure is secured.

With this blow-by gas recirculation device for an internal combustion engine such configured as described above, the vacuum pump ventilates the blow-by gas staying inside of the crankcase only when the ventilation shortage region determination unit determines that the operational region of the engine is the operational region in which the ventilation flow rate of the blow-by gas staying inside of the crankcase by the PCV device is short, and furthermore, the brake negative pressure determination unit determines that the brake negative pressure is secured. Thus, the vacuum pump can securely ventilate the blow-by gas that cannot be ventilated by the PCV device while securing the brake negative pressure.

Here, it is preferable that the ventilation of the blow-by gas staying inside of the crankcase by the vacuum pump should be interrupted when the brake negative pressure determination unit determines that the brake negative pressure is not secured while the vacuum pump ventilates the blow-by gas staying inside of the crankcase, and then, a brake negative pressure should be produced by the vacuum pump.

With this configuration, even if the vacuum pump is used for the ventilation of the blow-by gas staying inside of the crankcase, the ventilation of the blow-by gas staying inside of the crankcase by the vacuum pump is interrupted when the brake negative pressure is lower than required, and then, the production of the brake negative pressure by the vacuum pump is prioritized. Thus, the brake negative pressure can be kept in a required quantity.

Here, the internal combustion engine may be a natural aspiration type internal combustion engine, and the operational region in which the ventilation flow rate of the blow-by gas staying inside of the crankcase by the PCV device is short may be a region in which an intake pressure of the intake passage ranges from a negative pressure lower than an atmospheric pressure to the atmospheric pressure.

Here, the internal combustion engine may be an internal combustion engine with a turbocharger having a compressor disposed on the intake passage. In this case, the operational region in which the ventilation flow rate of the blow-by gas staying inside of the crankcase by the PCV device is short may be a region in which the intake pressure of the intake passage ranges from a negative pressure lower than the atmospheric pressure to a positive pressure higher than the atmospheric pressure.

Furthermore, the vacuum pump that is usable also for the recirculation of the blow-by gas to the intake passage may be an electric vacuum pump. In this case, the blow-by gas recirculation device may include:

a piping passage having an open/close control valve on the way, the piping passage configured to allow the inside of the crankcase and a suction port of the electric vacuum pump to communicate with each other;

another piping passage having a check valve on the way, the another piping passage configured to allow a discharge port of the electric vacuum pump and an intake passage upstream of a throttle valve to communicate with each other; and a fresh-air introduction passage configured to allow an intake passage upstream of the throttle valve and the inside of the crankcase to communicate with each other.

Additionally, the vacuum pump that is usable also for the recirculation of the blow-by gas to the intake passage may be an electric vacuum pump. The blow-by gas recirculation device may include:

a piping passage having an open/close control valve on the way, the piping passage configured to allow the inside of the crankcase and a suction port of the electric vacuum pump to communicate with each other; another piping passage having a check valve on the way, the another piping passage configured to allow a discharge port of the electric vacuum pump and an intake passage upstream of the compressor for the turbocharger to communicate with each other; and a fresh-air introduction passage configured to allow an intake passage upstream of the compressor for the turbocharger and the inside of the crankcase to communicate with each other.

The configuration using the above-described electric vacuum pump can reduce wasteful work so as to enhance fuel economy.

Advantageous Effects of Invention

The present invention produces excellent effects such as remarkable reduction of the risk of contact between blow-by gas and engine oil so as to inhibit the degradation of the oil.

Moreover, the configuration using the electric vacuum pump can reduce wasteful work so as to enhance fuel economy.

Additionally, the configuration including the fresh-air introduction passage can dilute the gas inside of the crankcase with fresh air all the time so as to reduce the concentration of the blow-by gas.

DESCRIPTION OF EMBODIMENTS

The following section will describe the embodiments of the present invention based on the attached drawings. Incidentally, the present invention is not limited to the following embodiments.

Figure 1:
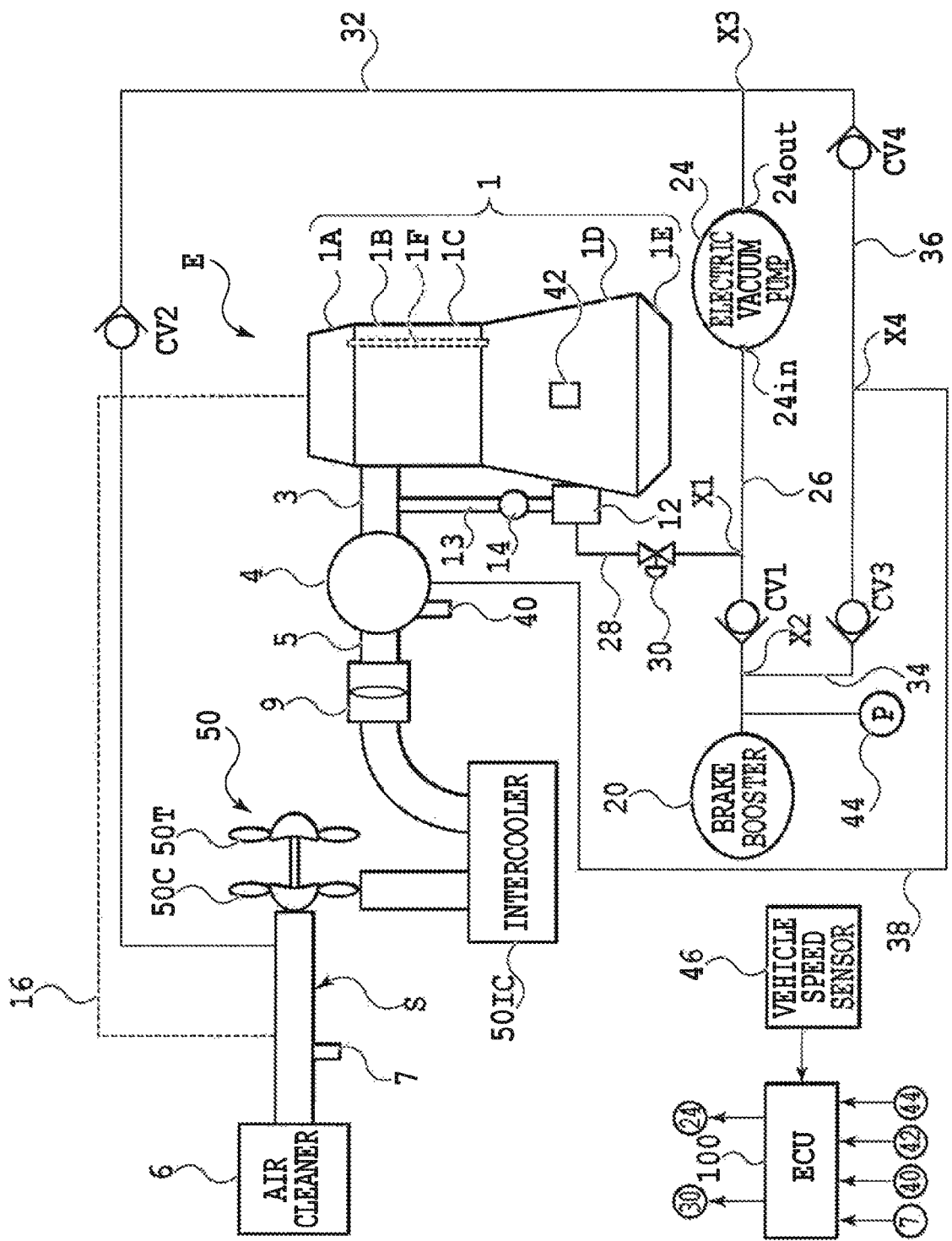
FIG. 1 is a schematic view illustrating a configuration of a blow-by gas recirculation device for an internal combustion engine with a turbocharger according to an embodiment of the present invention.

FIG. 1 illustrates a configuration of a blow-by gas recirculation device for an internal combustion engine with a turbocharger according to an embodiment of the present invention. The blow-by gas recirculation device in the present embodiment is applied to an internal combustion engine E mounted on a vehicle provided with a brake booster. The internal combustion engine E has an engine body 1. The engine body 1 includes, as well known, a head cover 1A, a cylinder head 1B, a cylinder block 1C, a crankcase 1D, and an oil pan 1E. The engine body 1 incorporates a piston, a connecting rod, a crankshaft, and the like therein, and furthermore, has a communication hole 1F penetrating through the cylinder head 1B and the cylinder block 1C. The communication hole 1F allows the head cover 1A and the inside of the crankcase 1D to communicate with each other. The internal combustion engine E illustrated in FIG. 1 is a multi-cylinder gasoline engine provided with a turbocharger 50 as a supercharger. Here, the number of cylinders, the layouts of cylinders (a straight type, a V type, a horizontally opposed type, and the like), and the like in the internal combustion engine E are not particularly restricted.

An intake port of each of the cylinders is connected to a surge tank 4 serving as an intake collection chamber via a branch pipe 3 for each of the cylinders. An intake pipe 5 is connected to the upstream side of the surge tank 4. At the intake pipe 5 are arranged an air cleaner 6, an air flow meter 7 for detecting an intake air quantity, a compressor 50C of the turbocharger 50, an intercooler 50IC, and an electronically controlled type throttle valve 9 in this order from upstream to downstream. The intake port, the branch pipe 3, the surge tank 4, and the intake pipe 5 form an intake passage S. Although not illustrated, with respect to each of the cylinders, an injector (i.e., a fuel injection valve) for injecting fuel is installed inside of the intake port, and furthermore, an ignition plug is installed inside of a combustion chamber.

In the meantime, an exhaust port of each of the cylinders is connected to a common exhaust pipe via an exhaust manifold, not illustrated. These exhaust port, exhaust manifold, and exhaust pipe form an exhaust passage. A turbine 50T of the turbocharger 50 is installed in the exhaust passage, and a three-way catalyst is arranged downstream of the turbine 50T. Although not illustrated, a bypass passage that bypasses the turbine 50T and an electronically controlled type wastegate valve for opening or closing the bypass passage are disposed on the exhaust passage. The wastegate valve is a butterfly valve similar to the throttle valve 9, and its opening degree can be continuously varied.

An oil separator 12 is attached to the crankcase 1D of the engine body 1. The oil separator 12 communicates with the inside of the crankcase 1D, and thus, introduces blow-by gas thereinto from the crankcase 1D, and then, separates oil contained in the blow-by gas.

The oil separator 12 and the surge tank 4 or the branch pipe 3 disposed downstream of the surge tank 4 communicate with each other via a first blow-by gas passage 13. In the first blow-by gas passage 13 is placed a positive crankcase ventilation (hereinafter abbreviated as "PCV") valve 14. The first blow-by gas passage 13 and the PCV valve 14 form a PCV device. When the PCV valve 14 is opened, the blow-by gas staying inside of the crankcase 1D is recirculated to the surge tank 4 through the oil separator 12 and the first blow-by gas passage 13 in this order.

Moreover, the inside of the head cover 1A and the intake passage S upstream of the air flow meter 7 communicate with each other via a fresh-air introduction passage 16.

Incidentally, the oil separator 12 communicates with a booster passage 26, described later, via a second blow-by gas passage 28.

In the meantime, the vehicle is provided with a brake booster 20 for assisting the operation of a brake pedal by a driver. The brake booster 20 is adapted to boost a brake pedal operation force during brake actuation by the use of a negative pressure that is supplied to a negative pressure chamber of the brake booster 20.

The negative pressure chamber of the brake booster 20 and a suction port 24in of an electric vacuum pump 24 communicate with each other via the booster passage 26. On the booster passage 26 is disposed a first check valve CV1 that permits only air to flow forward from the brake booster 20 to the electric vacuum pump 24 whereas prohibits the air from flowing reversely. The first check valve CV1 can prevent the negative pressure from leaking from the negative pressure chamber. Moreover, the oil separator 12 and the booster passage 26 communicate with each other via the second blow-by gas passage 28 that merges with the booster passage 26 at a confluent point X1 between the first check valve CV1 and the suction port 24in of the electric vacuum pump 24. On the second blow-by gas passage 28 is disposed a control valve 30 including a solenoid switch valve.

The control valve 30 takes a first position (i.e., a close position), at which the blow-by gas is prohibited from flowing from the oil separator 12 to the electric vacuum pump 24 through the second blow-by gas passage 28 and the booster passage 26, and a second position (i.e., an open position), at which the blow-by gas is permitted to flow there.

Moreover, in the present embodiment, a third blow-by gas passage 32 is provided for allowing a discharge port 24out of the electric vacuum pump 24 and the intake passage S upstream of the compressor 50C of the turbocharger 50 to communicate with each other. On the third blow-by gas passage 32 is disposed a second check valve CV2 for prohibiting the flow of gas from the intake passage S toward the electric vacuum pump 24.

Furthermore, a piping passage 34 that merges with the booster passage 26 at a confluent point X2 between the brake booster 20 and the first check valve CV1 merges, at a confluent point X4, with a piping passage 36 that merges with the third blow-by gas passage 32 at a confluent point X3 between the discharge port 24out of the electric vacuum pump 24 and the second check valve CV2, and then, both of the piping passages (34, 36) communicate with the surge tank 4 through a piping passage 38. Here, for prohibiting the air from reversely flowing from the surge tank 4, on the piping passage 34 is disposed a third check valve CV3 and on the piping passage 36 is disposed a fourth check valve CV4.

Among these piping passages 34, 36, and 38, the piping passage 34 having the third check valve CV3 disposed thereon and the piping passage 38 are adapted to supply a negative pressure from the surge tank 4 or the like to the negative pressure chamber of the brake booster 20 when an intake pressure is lower than the brake negative pressure of the brake booster 20. When the intake pressure is lower than the brake negative pressure, the negative pressure is supplied to the negative pressure chamber of the brake booster 20 via the third check valve CV3. The piping passage 36 having the fourth check valve CV4 disposed thereon and the piping passage 38 are designed to return, to the surge tank 4 in a negative pressure state, gas discharged from the discharge port 24out of the electric vacuum pump 24.

Here, the blow-by gas recirculation device in the present embodiment is provided with an electronic control unit (hereinafter abbreviated as "ECU") 100 serving as a controller or a control unit. The ECU 100 is configured to control not only the control valve 30 and the electric vacuum pump 24 but also the above-described throttle valve 9, injector, ignition plug, and wastegate valve. Besides, the ECU 100 is configured to control the internal combustion engine E and various devices, not illustrated, of the vehicle.

As to sensors, in addition to the above-described air flow meter 7, to the ECU 100 are especially connected an intake pressure sensor 40 for detecting a pressure inside of the intake passage S downstream of the throttle valve 9 (referred to as an intake pressure), a crank angle sensor 42 for detecting a crank angle of the internal combustion engine E, a pressure sensor 44 for detecting a pressure at the negative pressure chamber of the brake booster 20, and a vehicle speed sensor 46.

The ECU 100 detects a crank angle per se in response to a crank pulse signal output from the crank angle sensor 42, and furthermore, detects an engine speed (rpm). Here, the term "engine speed" refers to an engine speed per unit time, and is a synonym of a rotational speed.

The ECU 100 detects an intake air quantity that signifies the quantity of intake air per unit time in response to a signal output from the air flow meter 7. Moreover, the ECU 100 detects a load on the engine 1 based on the detected intake air quantity.

Figure 2:
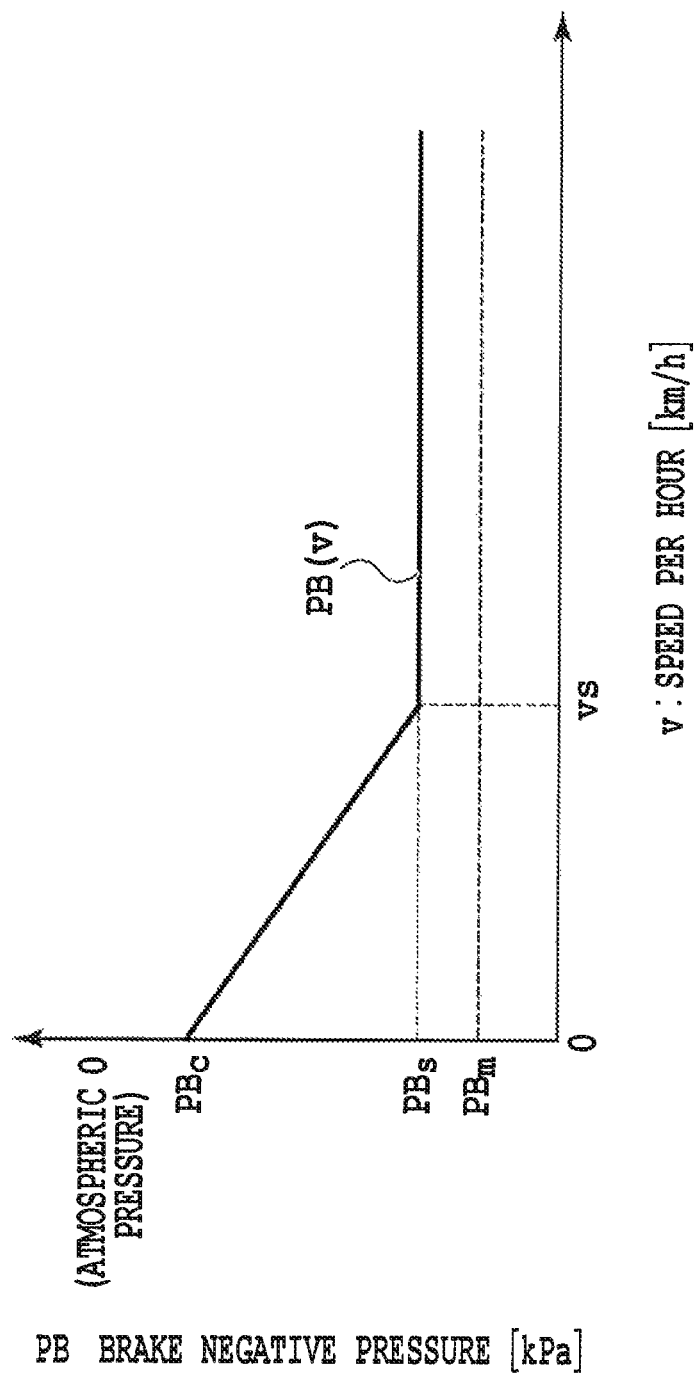
FIG. 2 is a graph illustrating the relationship between a vehicle speed and a negative pressure that should be secured inside of a brake booster.

Explanation will be made on the relationship between a brake negative pressure that should be secured in the negative pressure chamber of the brake booster 20 used in the present embodiment and a vehicle speed with reference to FIG. 2. FIG. 2 is a graph in which a lateral axis represents a vehicle speed v (km/h) and a vertical axis represents a brake negative pressure PB (kPa). In general, as the vehicle speed v becomes higher, a longer brake time or a larger brake force is required. Therefore, the brake negative pressure PB takes a value PBs that is set to be much more negative than the atmospheric pressure in a region in which the vehicle speed v exceeds a predetermined middle speed vs. In contrast, a large brake force is not so much required between zero to the predetermined middle speed vs. Therefore, the brake negative pressure PB is set to be linearly varied from a brake negative pressure PBc approximate to the atmospheric pressure to the above-described brake negative pressure PBs that is set to be much more negative. Incidentally, in the case where the negative pressure is consumed (or reduced) beyond a set line PB(v) of the brake negative pressure PB (i.e., upward in FIG. 2), it is determined that a predetermined value of the brake negative pressure PB is not secured, and then, the vacuum pump is actuated so as to start the production of a brake negative pressure. As a result of the production of the brake negative pressure PB, when the brake negative pressure PB reaches a lower limit value PBm in FIG. 2, the actuation of the vacuum pump is stopped.

First Embodiment

Here, a description will be given of a function of the present invention in a natural aspiration type internal combustion engine in a first embodiment according to the present invention. The natural aspiration type internal combustion engine is identical to the internal combustion engine with the turbocharger illustrated in FIG. 1 except that the turbocharger 50 including the compressor 50C of an intake system, the turbine 50T of an exhaust system, and the wastegate valve, and the intercooler 50IC are not provided. Therefore, the natural aspiration type internal combustion engine is not illustrated anew, and the description will be given on the assumption of their absence.

The natural aspiration type internal combustion engine can recirculate blow-by gas staying inside of the crankcase 1D to the intake passage S (i.e., the surge tank 4) by the use of the PCV device (including the first blow-by gas passage 13 and the PCV valve 14) in a predetermined operating region. In other words, since a pressure downstream of the PCV valve 14 (i.e., on the side of the surge tank 4) is lower than a pressure upstream thereof (i.e., on the side of the crankcase 1D), the PCV valve 14 is opened, thus achieving the recirculation of the blow-by gas.

Figure 3:
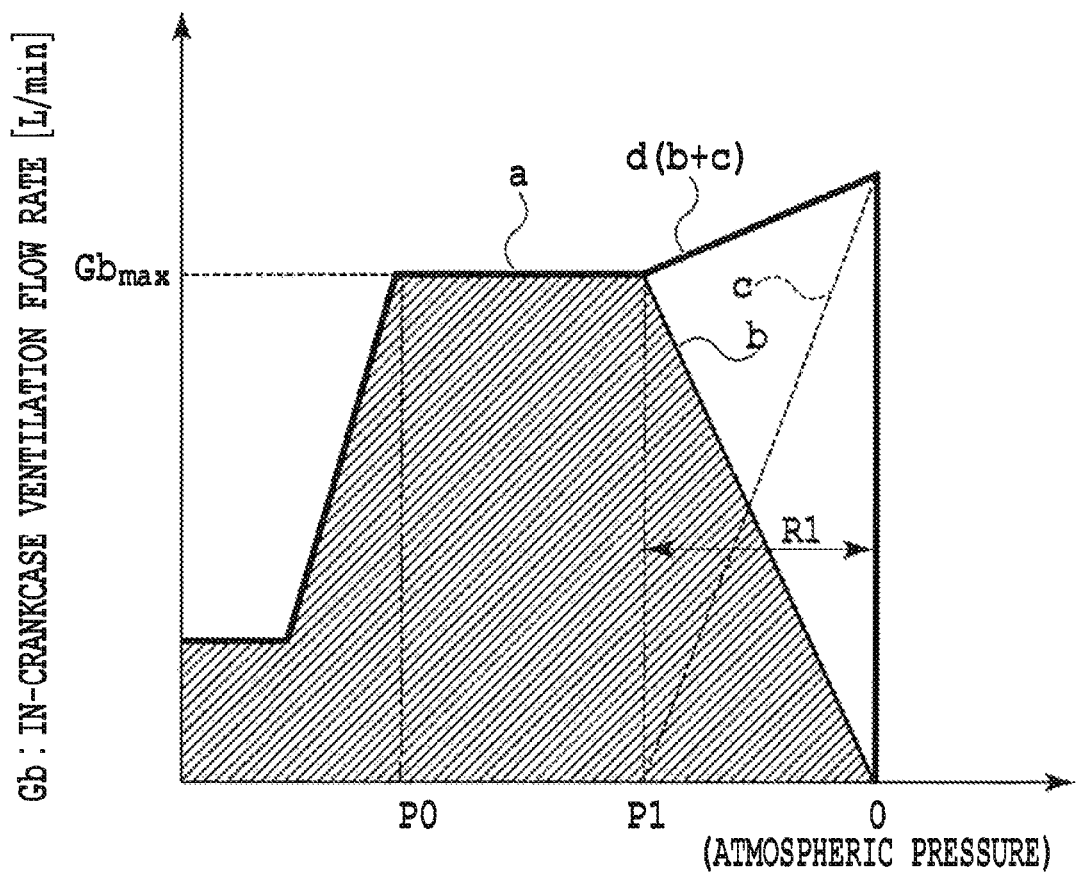
FIG. 3 is a graph illustrating the relationship between an intake pressure and an in-crankcase ventilation flow rate in a natural aspiration type internal combustion engine according to an embodiment of the present invention.

Specifically, the relationship between an intake pressure Pk (kPa) of the intake passage S and an in-crankcase ventilation flow rate Gb (L/min) in the natural aspiration type internal combustion engine is illustrated in FIG. 3. Here, the intake pressure Pk refers to a pressure inside of the intake passage S downstream of the throttle valve 9, and specifically, to an intake pressure Pk inside of the surge tank 4, detected by the intake pressure sensor 40. The pressure is represented by a gage pressure with a difference with reference to the atmospheric pressure. As is obvious from FIG. 3, the in-crankcase ventilation flow rate Gb equivalent to a maximum flow rate Gbmax can be achieved, by the PCV device, in an operating region in which a pressure ranges from P0 to P1 out of operating regions in which the intake pressure Pk is lower than a pressure P1.

However, as the intake pressure Pk approaches the atmospheric pressure beyond the pressure P1 within the operating region in which the intake pressure Pk ranges from the pressure P1 to the atmospheric pressure (i.e., the intake pressure Pk=0), a blow-by gas recirculation quantity by the PCV device or the in-crankcase ventilation flow rate Gb starts to be decreased, thereby making it difficult to satisfactorily ventilate the inside of the crankcase. In other words, as the intake pressure Pk increases within the intake pressure in which $P1 \leq Pk \leq 0$, the in-crankcase ventilation flow rate Gb by the PCV device gradually decreases from the maximum flow rate Gbmax indicated by a thick solid line a, and finally it becomes zero (see a thin solid line b). The range of the intake pressure in the operating region in which the PCV ventilation flow rate in the natural aspiration type internal combustion engine is not sufficient is expressed by a PCV ventilation flow rate shortage region R1 in FIG. 3. Hereinafter, the intake pressure P1 at which the shortage of the ventilation flow rate starts will be referred to as a shortage start intake pressure P1.

In view of the above, in the natural aspiration type internal combustion engine according to the first embodiment, when the intake pressure Pk becomes the shortage start intake pressure P1, the electric vacuum pump 24 is actuated, and furthermore, the control valve 30 is opened so as to recirculate the blow-by gas by the use of the electric vacuum pump 24 (see a broken line c in the drawing). In this manner, it is possible to compensate or complement the in-crankcase ventilation flow rate Gb that is insufficient according to the PCV device (see a thick solid line d (=b+c) in the drawing) so as to achieve a satisfactory in-crankcase ventilation flow rate Gb.

Figure 4:
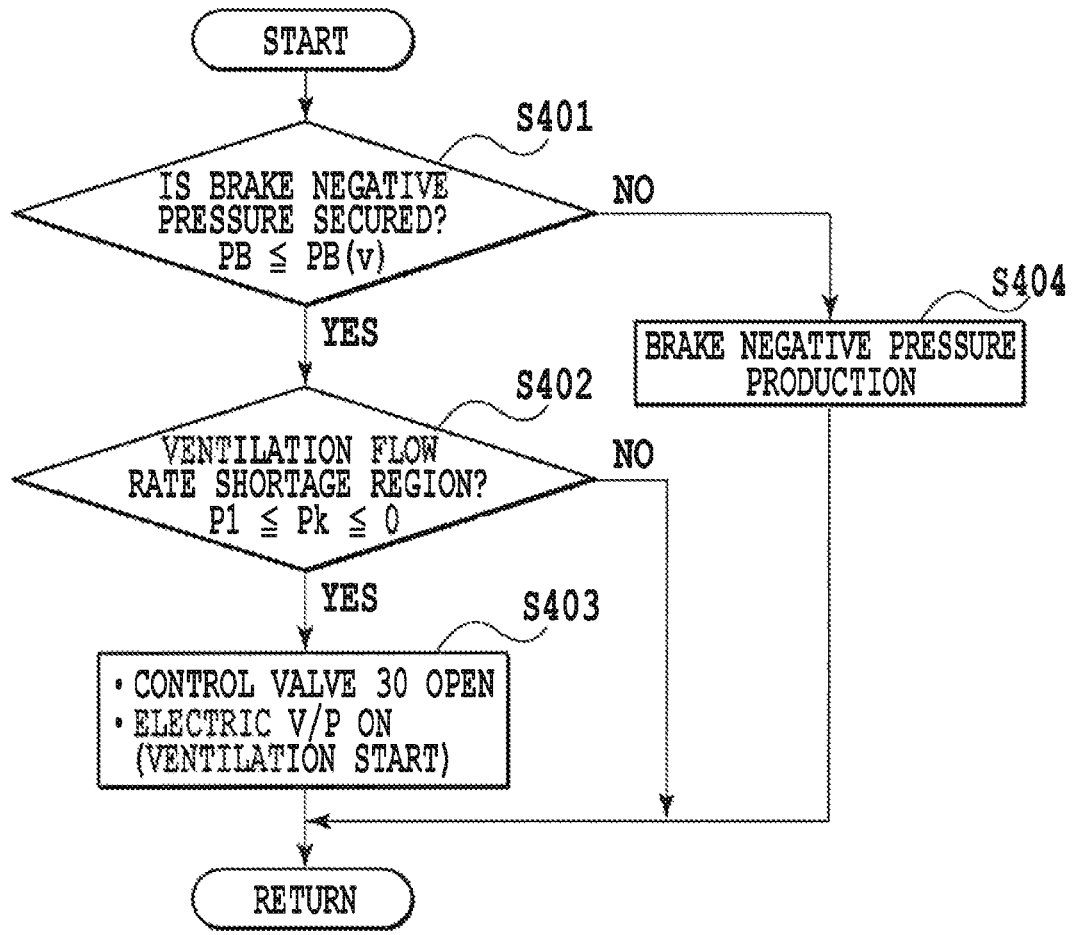
FIG. 4 is a flowchart illustrating one example of a control routine in the natural aspiration type internal combustion engine according to the embodiment of the present invention.

FIG. 4 illustrates one example of a control routine in the above-described natural aspiration type internal combustion engine. This routine is repeatedly executed per predetermined arithmetic cycle by the ECU 100.

In step S401, it is determined whether or not the brake negative pressure PB of the brake booster 20, detected by the pressure sensor 44 securely takes a predetermined value. In other words, it is determined whether or not the brake negative pressure PB is consumed (i.e., reduced) in excess of the set line PB (v) that is set according to a vehicle speed (PB≤PB (v)?). If it is secured (Yes), the control proceeds to step S402, in which it is determined whether or not the engine is in the operating region in which the in-crankcase ventilation flow rate Gb by the above-described PCV device is insufficient. In particular, it is determined whether or not the intake pressure Pk is equal to or higher than the shortage start intake pressure P1 and is equal to or lower than the atmospheric pressure (P1≤Pk 5≤0 ?). Specifically, it is determined whether or not the intake pressure Pk falls in the ventilation flow rate shortage region R1 by the PCV device. If the determination in step S402 is No, this routine comes to an end.

If the determination in step S402 is Yes, the control proceeds to step S403, in which the control valve 30 of the second blow-by gas passage 28 is opened, and furthermore, the actuation of the electric vacuum pump 24 is started. Consequently, at least a part of the blow-by gas staying inside of the crankcase 1D is recirculated to the intake passage S near the surge tank 4 or the branch pipe 3 through the oil separator 12, the first blow-by gas passage 13, and its PCV valve 14 together with a fresh air introduced from the intake passage S upstream of the throttle valve 9 to the crankcase 1D via the fresh-air introduction passage 16. At the same time, the blow-by gas staying inside of the crankcase 1D is sucked by the electric vacuum pump 24 via the oil separator 12, the second blow-by gas passage 28, and its opened control valve 30, and is discharged from the discharge port 24out. And then, the blow-by gas is recirculated to the intake passage S near the surge tank 4 or the branch pipe 3 through the piping passage 36 having the fourth check valve CV4 disposed thereon and the piping passage 38. As a consequence, the electric vacuum pump 24 recirculates the blow-by gas even in the ventilation flow rate shortage region R1 by the PCV device, thus suppressing the stay of the blow-by gas in the crankcase 1D.

In the meantime, if it is determined in step S401 that the brake negative pressure PB of the brake booster 20, detected by the pressure sensor 44, is not secured (if the determination is No), the control proceeds to step S404, in which the brake negative pressure starts to be produced. Specifically, the electric vacuum pump 24 is actuated so that the brake negative pressure production continues until the brake negative pressure PB inside of the brake booster 20 falls below the set line PB (v) and reaches the negative pressure lower limit PBm illustrated in FIG. 2.

Second Embodiment

Next, explanation will be made on the function of the present invention in an internal combustion engine with a turbocharger in a second embodiment of the present invention. The internal combustion engine with a turbocharger is shown in FIG. 1, and is configured by adding, to a natural aspiration type internal combustion engine, a turbocharger 50 including an intake system compressor 50C, an exhaust system turbine 50T, and a wastegate valve, and an intercooler 50IC, as described above.

Figure 5:
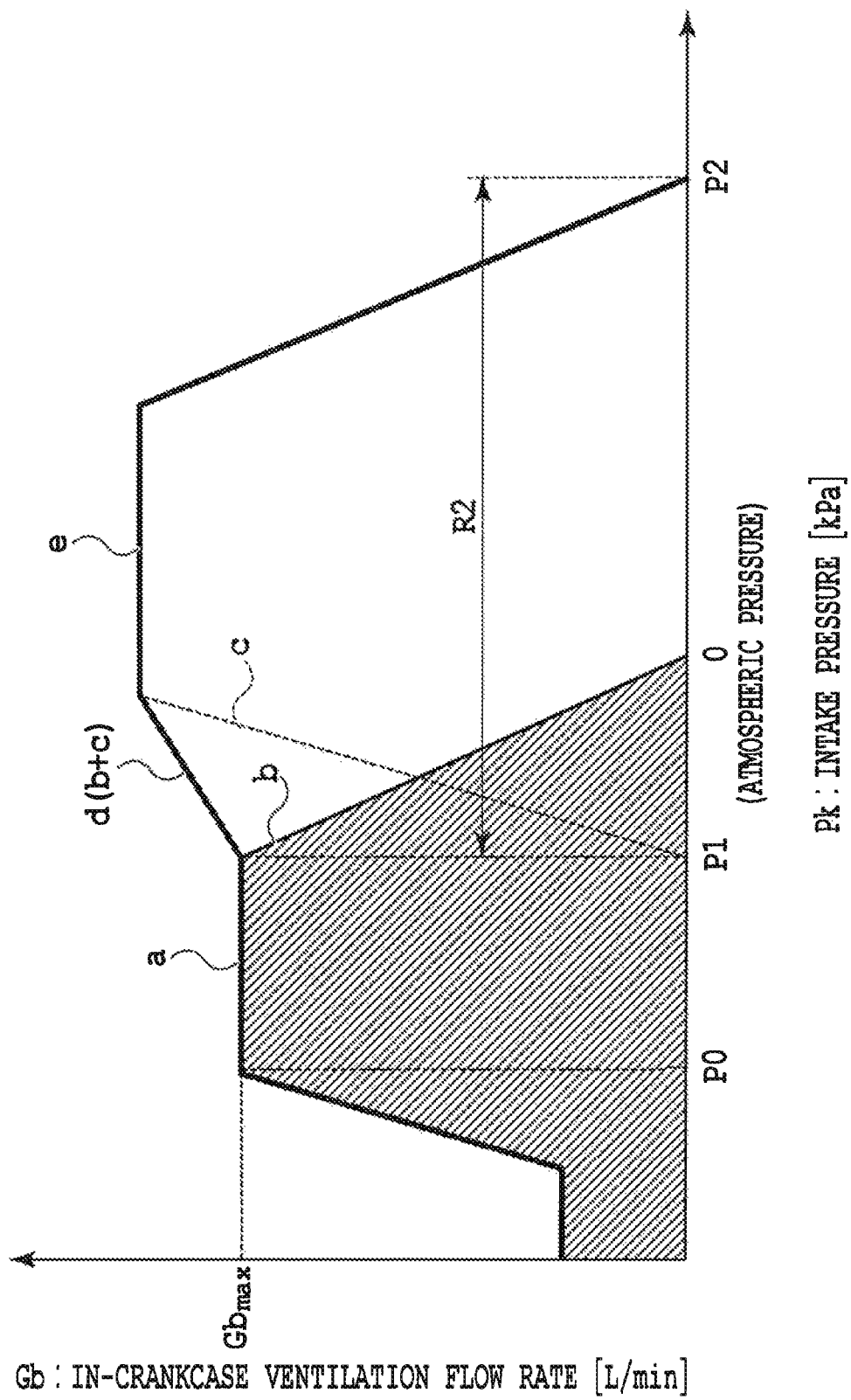
FIG. 5 is a graph illustrating the relationship between an intake pressure and an in-crankcase ventilation flow rate in the internal combustion engine with a turbocharger according to the embodiment of the present invention.

The internal combustion engine with a turbocharger in the present embodiment is operated in a manner similar to the above-described natural aspiration type internal combustion engine in a non-supercharging operating region in which no supercharging is performed. FIG. 5 shows the relationship between an intake pressure Pk (kPa) of an intake passage S and an in-crankcase ventilation flow rate Gb (L/min). As is obvious from FIG. 5, in an operation region in which the intake pressure Pk is lower than the above-described shortage start intake pressure P1, a PCV device can achieve providing the in-crankcase ventilation flow rate Gb equivalent to a maximum flow rate Gbmax in an operational region in which the intake pressure Pk ranges between a pressure P0 that is lower than a pressure P1 and the pressure P1. However, in a supercharging operating region in which supercharging is performed, a pressure in the intake passage S downstream of a PCV valve 14 becomes higher than a pressure inside of the crankcase 1D upstream thereof, and therefore, the PCV valve 14 cannot be opened so that the PCV device does not recirculate blow-by gas. Specifically, as the intake pressure Pk approaches an atmospheric pressure in excess of the pressure P1, the in-crankcase ventilation flow rate Gb starts to decrease, thereby making it difficult to satisfactorily recirculate blow-by gas, like the natural aspiration type internal combustion engine. As the intake pressure Pk increases, the in-crankcase ventilation flow rate Gb by the PCV device is gradually reduced from the maximum flow rate Gbmax to become zero around the atmospheric pressure in the end. Thereafter, the in-crankcase ventilation flow rate Gb remains zero from the atmospheric pressure to a supercharging pressure P2 that is a positive pressure higher than the atmospheric pressure while the supercharging pressure increases. FIG. 5 shows a PCV ventilation flow rate shortage region R2 within an intake pressure range of P1≤Pk≤P2. The intake pressure range includes the operational region in which the in-crankcase ventilation flow rate Gb is not sufficient by the PCV device and an operational region in which it is zero.

In view of the above, in the internal combustion engine with a turbocharger in the present embodiment, the operation of an electric vacuum pump 24 is started, and furthermore, a control valve 30 is opened when the intake pressure Pk becomes the pressure P1 in the non-supercharging operating region, thereby recirculating the blow-by gas by utilizing the electric vacuum pump 24. In this manner, it is possible to compensate or complement the in-crankcase ventilation flow rate Gb that may be short in some PCV devices. Moreover, in the supercharging operating region, a sufficient in-crankcase ventilation flow rate Gb can be achieved only by the electric vacuum pump 24. Here, reference characters a, b, c, and d in FIG. 5 are the same as those illustrated in FIG. 3. Reference character e designates a maximum value of the in-crankcase ventilation flow rate Gb only by the electric vacuum pump 24.

Figure 6:
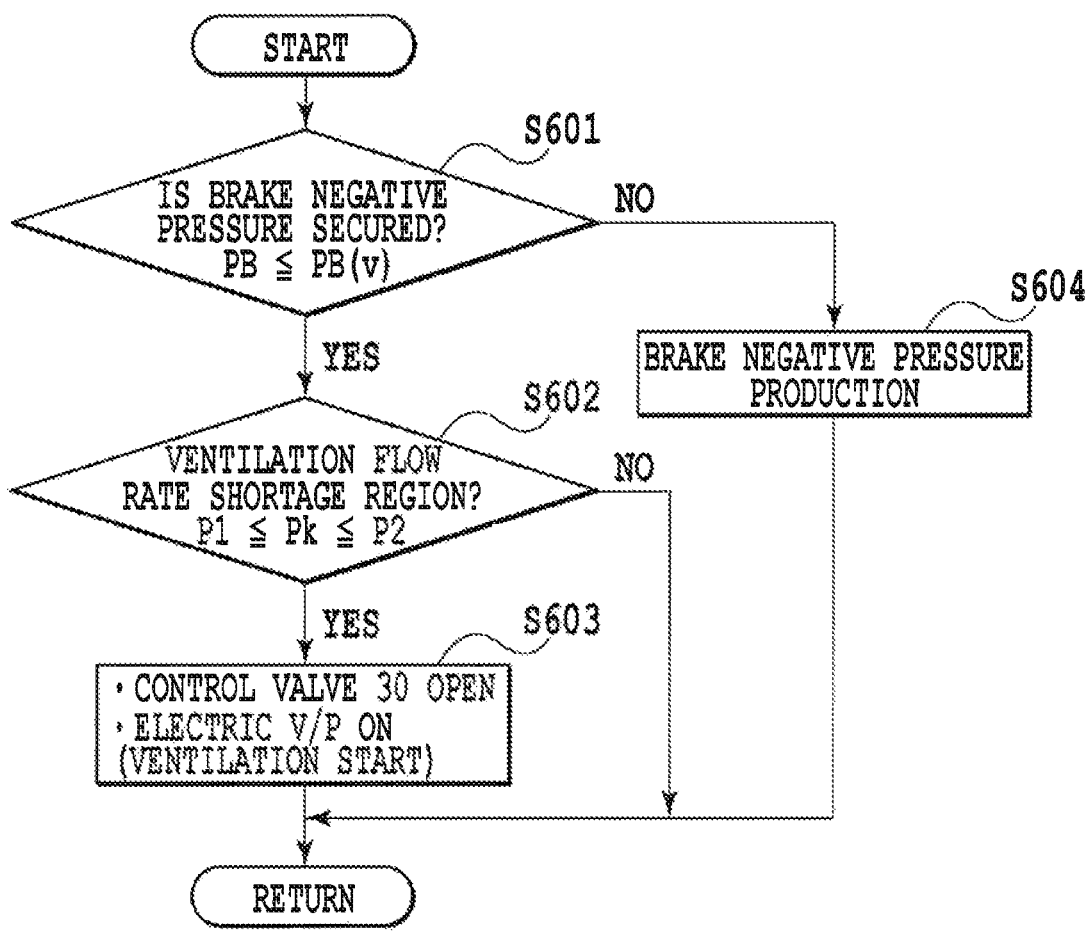
FIG. 6 is a flowchart illustrating one example of a control routine in the internal combustion engine with a turbocharger according to the embodiment of the present invention.

FIG. 6 illustrates one example of a control routine in the above-described internal combustion engine with a turbocharger. This routine is repeatedly executed per predetermined arithmetic cycle by an ECU 100.

In step S601, it is determined whether or not a brake negative pressure PB of a brake booster 20, detected by a pressure sensor 44 securely takes a predetermined value. In other words, it is determined whether or not the brake negative pressure PB is consumed (i.e., reduced) in excess of a set line PB (v) that is set according to a vehicle speed (PB≤PB (v)?). If it is secured (Yes), the control proceeds to step S602, in which it is determined whether or not the engine is in the operating region in which the in-crankcase ventilation flow rate Gb by the above-described PCV device is insufficient. In particular, it is determined whether or not the intake pressure Pk is equal to or higher than the intake pressure P1 at the beginning of the shortage and is equal to or lower than the intake pressure P2 (P1≤Pk≤P2?). Specifically, it is determined whether or not the intake pressure Pk falls in the ventilation flow rate shortage region R2 by the PCV device. If the determination in step S602 is No, this routine comes to an end.

If the determination in step S602 is Yes, the control proceeds to step S603, in which a control valve 30 of a second blow-by gas passage 28 is opened, and furthermore, the actuation of the electric vacuum pump 24 is started. Consequently, at least a part of the blow-by gas staying inside of the crankcase 1D is recirculated to the intake passage S near a surge tank 4 or a branch pipe 3 through an oil separator 12, a first blow-by gas passage 13, and its PCV valve 14 together with a fresh air introduced from the intake passage S upstream of an air flow meter 7 to the crankcase 1D via a fresh-air introduction passage 16. At the same time, the blow-by gas staying inside of the crankcase 1D is sucked by the electric vacuum pump 24 via the oil separator 12, the second blow-by gas passage 28, and its control valve 30, and is discharged from a discharge port 24out. At this time, in the case where the intake pressure Pk in the non-supercharging region is lower than the atmospheric pressure, the blow-by gas is recirculated to the intake passage S near the surge tank 4 or the branch pipe 3 through a piping passage 36 having a fourth check valve CV4 disposed thereon and a piping passage 38. In the meantime, in the case where the intake pressure Pk in the supercharging region is higher than the atmospheric pressure, the blow-by gas is recirculated to the intake passage S downstream of an inlet of the fresh-air introduction passage 16 and upstream of the compressor 50C, through a piping passage 32 having a second check valve CV2 disposed thereon. As a consequence, the electric vacuum pump 24 ventilates the inside of the crankcase even in the ventilation flow rate shortage region R2 by the PCV device, thus suppressing the stay of the blow-by gas in the crankcase 1D. Here, in a mode in which gas discharged from the electric vacuum pump 24 is recirculated to the intake passage S near the surge tank 4 or the branch pipe 3 can reduce a drive load on the electric vacuum pump 24.

In the meantime, if it is determined in step S601 that the brake negative pressure PB of the brake booster 20, detected by the pressure sensor 44, is not secured (if the determination is No), the control proceeds to step S604, in which the brake negative pressure starts to be produced. Specifically, the electric vacuum pump 24 is actuated so that the brake negative pressure production continues until the brake negative pressure PB inside of the brake booster 20 falls below the set line PB (v) and reaches a negative pressure lower limit PBm illustrated in FIG. 2.

In each of the above-described natural aspiration type internal combustion engine and internal combustion engine with the turbocharger, it has been determined based on the value of the intake pressure Pk whether or not the operational state of the internal combustion engine falls within the ventilation flow rate shortage region R1 and/or R2 by the PCV device. However, the determination may be based on a value of a parameter representing the operational state of the internal combustion engine (e.g., an engine speed Ne and a load ratio (a ratio of a load with respect to the entire load) K1 or an engine speed and an intake air quantity). For example, on a map defined by the engine speed Ne and the load ratio K1, a region R1' and/or R2' corresponding to the above-described ventilation flow rate shortage region R1 and/or R2 may be previously determined, and then, it may be determined that the operational state of the internal combustion engine falls within the ventilation flow rate shortage region R1 and/or R2 by the PCV device when an actual engine speed Ne and an actual load ratio K1 fall within the region R1' and/or R2', thereby turning on the electric vacuum pump 24 so as to start the actuation.

Although the first and second preferred embodiments according to the present invention have been explained, the present invention is applicable to other embodiments. For example, as illustrated in FIG. 3 and FIG. 5, the PCV device can achieve the sufficient in-crankcase ventilation flow rate Gb (see a thick solid line a) in the low load operating region in which the intake pressure Pk is lower than the intake pressure P1 in each of the natural aspiration type internal combustion engine and the internal combustion engine with a turbocharger. In other words, the PCV ventilation flow rate shortage region R1 or R2 exists only in the operational region of the intake pressure Pk that is higher than the intake pressure P1. However, the sufficient in-crankcase ventilation flow rate Gb may not be achieved by PCV device even in the low load operating region in which the intake pressure Pk is lower than the intake pressure P1, depending on the internal combustion engine.

In view of the above, in third and fourth embodiments according to the present invention, the electric vacuum pump 24 ventilates the inside of a crankcase in all PCV ventilation flow rate shortage regions.

Third Embodiment

Figure 7:
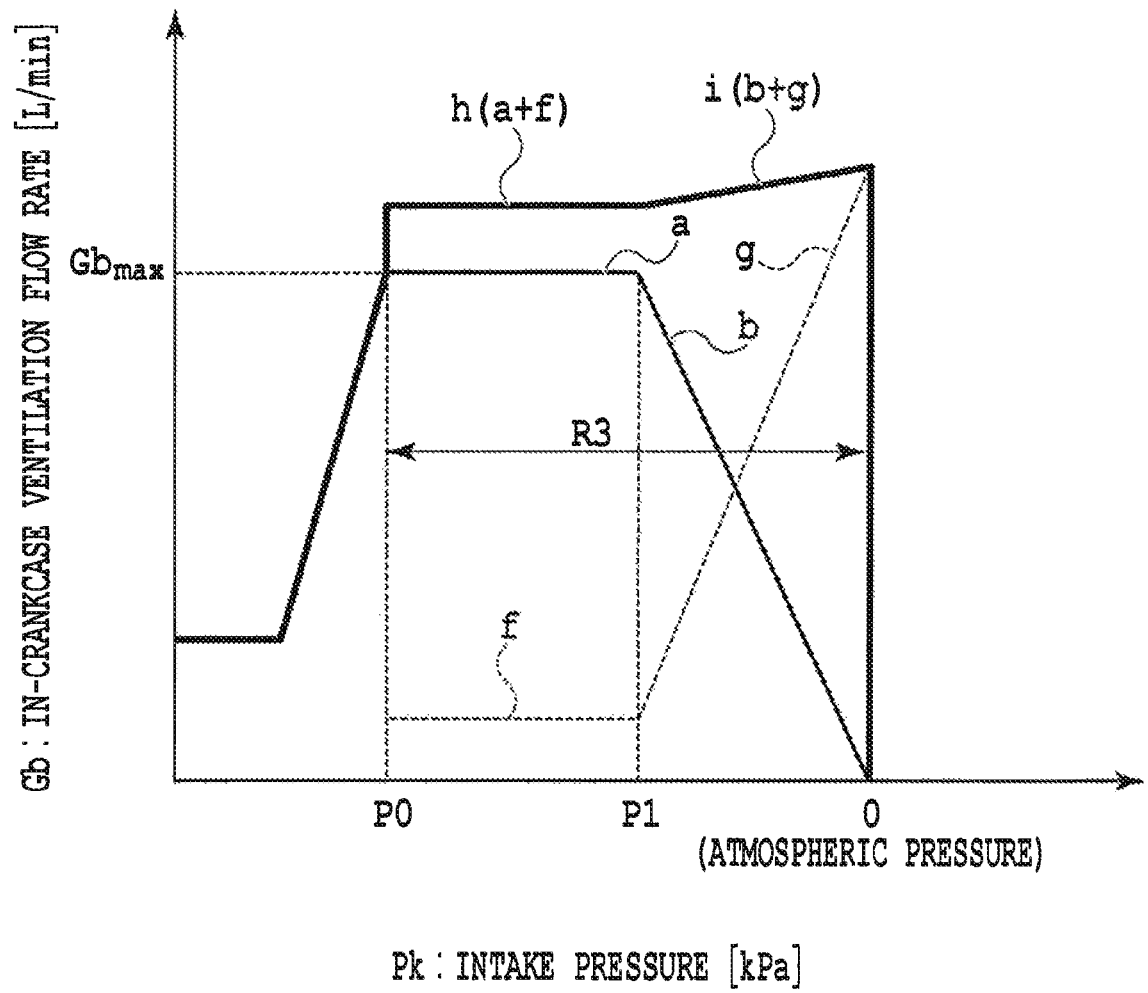
FIG. 7 is a graph illustrating the relationship between an intake pressure and an in-crankcase ventilation flow rate in a natural aspiration type internal combustion engine according to another embodiment of the present invention.

Specifically, in the case of the natural aspiration type internal combustion engine, for example, an operational region in which an intake pressure Pk falls from an intake pressure P0 to the atmospheric pressure (Pk=0) is referred to as a PCV ventilation flow rate shortage region R3, as illustrated in FIG. 7, and an electric vacuum pump 24 is actuated in this region. At this time, the electric vacuum pump 24 is actuated such that a constant flow rate can be achieved (see a broken line f) when the intake pressure Pk falls from the intake pressure P0 to the intake pressure P1. In contrast, the electric vacuum pump 24 is actuated such that when the intake pressure Pk exceeds the intake pressure P1, the flow rate increases at a predetermined rate (see a broken line g).

Fourth Embodiment

Figure 8:
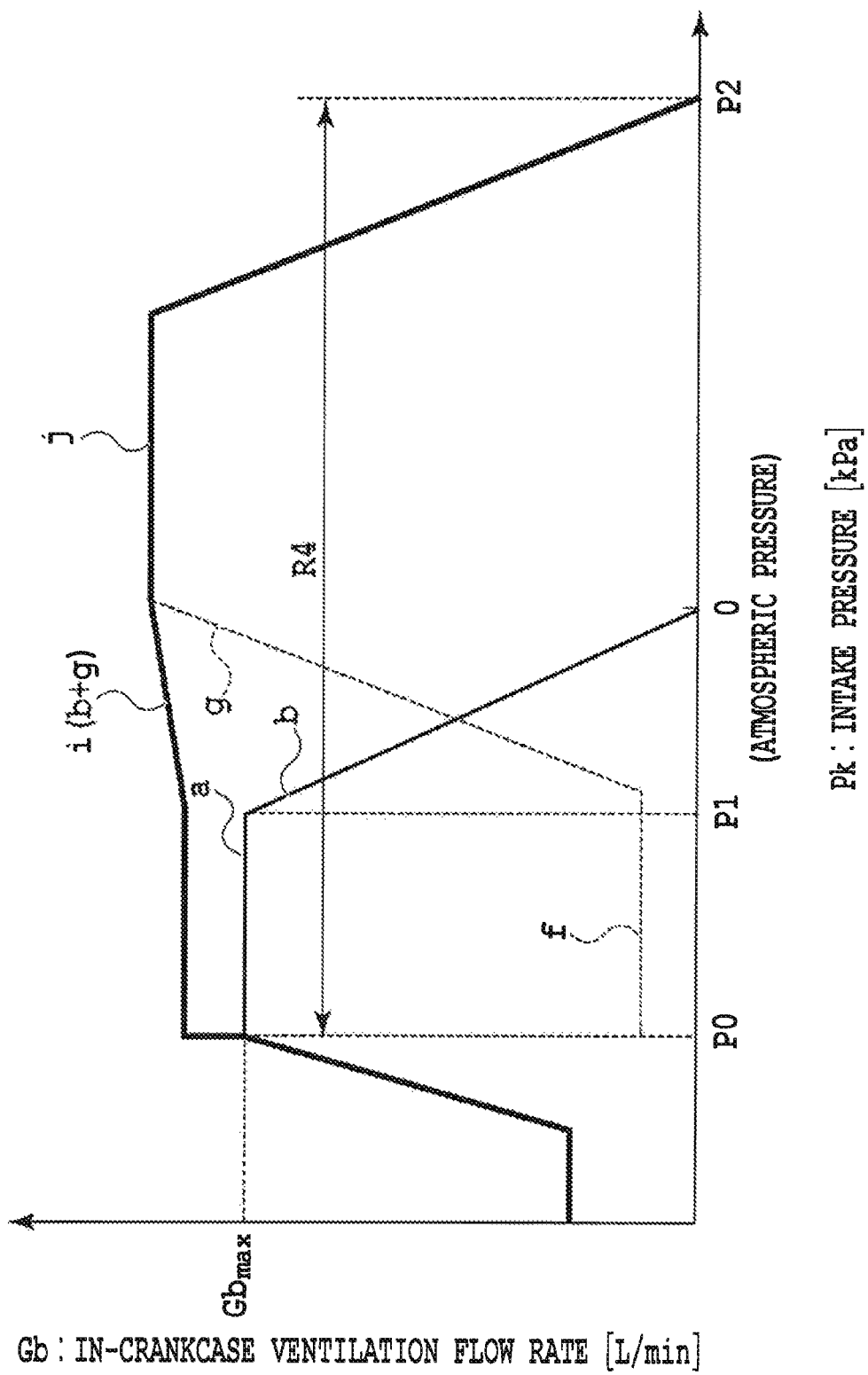
FIG. 8 is a graph illustrating the relationship between an intake pressure and an in-crankcase ventilation flow rate in an internal combustion engine with a turbocharger according to a further embodiment of the present invention.

In the case of an internal combustion engine with a turbocharger, as illustrated in FIG. 8, an electric vacuum pump 24 is actuated in an operational region in which an intake pressure Pk falls from an intake pressure P0 to an intake pressure P2, is referred to as a PCV ventilation flow rate shortage region R4, for example. At this time, the electric vacuum pump 24 is actuated such that a constant flow rate can be achieved when the intake pressure Pk falls from the intake pressure P0 to the intake pressure P1 (see a broken line f), the flow rate increases at a predetermined rate until the intake pressure Pk reaches the atmospheric pressure in excess of the intake pressure P1 (see the broken line g), and a constant flow rate can be achieved up to a supercharging pressure P2 in excess of the atmospheric pressure (see a solid line j).

Although the electric vacuum pump is used as a vacuum pump in the above-described embodiment, it is not limited to this. It is to be understood that a mechanical vacuum pump which is driven by a crankshaft of an internal combustion engine and whose ON or OFF is controlled by an electromagnetic clutch or the like may be used.

The embodiments of the present invention encompass every modification or application and equivalents embodied by the idea of the present invention, defined by claims.

Consequently, the present invention should not be restrictively interpreted, but can be applied to any other techniques pertaining within the scope of the idea of the present invention.

The invention claimed is:

1. A blow-by gas recirculation device for an internal combustion engine, the blow-by gas recirculation device including a vacuum pump that serves as a negative pressure source for a brake booster and is usable also for recirculation of blow-by gas to an intake passage, the blow-by gas recirculation device comprising:
   a PCV device configured to recirculate blow-by gas staying inside of a crankcase to the intake passage;
   a ventilation shortage region determination unit implemented by an ECU and configured to determine whether or not an operational region of the engine is an operational region in which the ventilation flow rate of the blow-by gas staying inside of the crankcase by the PCV device is short, wherein the operational region in which the ventilation flow rate of the blow-by gas staying inside of the crankcase by the PCV device is short is a region in which an intake pressure in the intake passage ranges from a predetermined negative pressure lower than an atmospheric pressure to a pressure equal to or higher than the atmospheric pressure, the predetermined negative pressure being a pressure at which the ventilation flow rate begins to decrease; and
   a brake negative pressure determination unit implemented by an ECU and configured to determine whether or not a brake negative pressure of the brake booster is secured,
   wherein the vacuum pump ventilates the blow-by gas staying inside of the crankcase only when the ventilation shortage region determination unit determines that the operational region of the engine is the operational region in which the ventilation flow rate of the blow-by gas staying inside of the crankcase by the PCV device is short, and furthermore, the brake negative pressure determination unit determines that the brake negative pressure is secured.

2. The blow-by gas recirculation device for an internal combustion engine according to claim 1, wherein the ventilation of the blow-by gas staying inside of the crankcase by the vacuum pump is interrupted when the brake negative pressure determination unit determines that the brake negative pressure is not secured while the vacuum pump ventilates the blow-by gas staying inside of the crankcase, and then, a brake negative pressure is produced by the vacuum pump.

3. The blow-by gas recirculation device for an internal combustion engine according to claim 2, wherein the internal combustion engine is a natural aspiration type internal combustion engine.

4. The blow-by gas recirculation device for an internal combustion engine according to claim 3, wherein the vacuum pump that is usable also for the recirculation of the blow-by gas to the intake passage is an electric vacuum pump, the blow-by gas recirculation device including:
   a piping passage having an open/close control valve on the way, the piping passage configured to allow the inside of the crankcase and a suction port of the electric vacuum pump to communicate with each other;
   another piping passage having a check valve on the way, the another piping passage configured to allow a discharge port of the electric vacuum pump and an intake passage upstream of a throttle valve to communicate with each other; and
   a fresh-air introduction passage configured to allow an intake passage upstream of the throttle valve and the inside of the crankcase to communicate with each other.

5. The blow-by gas recirculation device for an internal combustion engine according to claim 2, wherein the internal combustion engine is an internal combustion engine with a turbocharger, the internal combustion engine being provided with a compressor for the turbocharger on the intake passage.

6. The blow-by gas recirculation device for an internal combustion engine according to claim 5, wherein the vacuum pump that is usable also for the recirculation of the blow-by gas to the intake passage is an electric vacuum pump, the blow-by gas recirculation device including:
   a piping passage having an open/close control valve on the way, the piping passage configured to allow the inside of the crankcase and a suction port of the electric vacuum pump to communicate with each other;
   another piping passage having a check valve on the way, the another piping passage configured to allow a discharge port of the electric vacuum pump and an intake passage upstream of the compressor for the turbocharger to communicate with each other; and
   a fresh-air introduction passage configured to allow an intake passage upstream of the compressor for the turbocharger and the inside of the crankcase to communicate with each other.

* * * * *